United States Patent [19]

McLaurin et al.

[11] Patent Number: 4,807,024

[45] Date of Patent: Feb. 21, 1989

[54] THREE-DIMENSIONAL DISPLAY METHODS AND APPARATUS

[75] Inventors: A. Porter McLaurin, Chapin; LeConte Cathey; Edwin R. Jones, Jr., both of Columbia, all of S.C.

[73] Assignee: The University of South Carolina, Columbia, S.C.

[21] Appl. No.: 59,759

[22] Filed: Jun. 8, 1987

[51] Int. Cl.$^4$ .......................... H04N 13/00; H04N 7/8
[52] U.S. Cl. ...................................... 358/88; 358/108; 350/144; 350/130
[58] Field of Search ................. 358/88, 89, 92, 3, 108; 350/130, 132, 133, 144; 352/57

[56] References Cited

U.S. PATENT DOCUMENTS

| | | | |
|---|---|---|---|
| 3,527,880 | 9/1970 | Gorden | 358/89 |
| 4,006,291 | 2/1977 | Imsand | 358/92 |
| 4,429,328 | 1/1984 | Jones, Jr. et al. | 358/88 |
| 4,528,587 | 7/1985 | Jones, Jr. | 358/92 |
| 4,543,603 | 9/1985 | Laurès | 358/108 |
| 4,567,513 | 1/1986 | Imsand | 358/92 |
| 4,647,965 | 3/1987 | Imsand | 358/88 |

Primary Examiner—James J. Groody
Assistant Examiner—John K. Peng
Attorney, Agent, or Firm—Brumbaugh, Graves, Donohue & Raymond

[57] ABSTRACT

Three-dimensional images are produced from a sequence of images generated by a single camera mounted on a platform moving at constant velocity and spacing with respect to a subject to be imaged. Stereoscopically related images in the sequence are presented for viewing alternately at a rate of about ten per second so that the image seen by an observer is perceived as having depth. By recording the stereoscopically related images alternately on the same film, the images produced when the film is projected are perceived as three-dimensional. A video camera may be used to generate the original sequence of stereoscopically related images, in which case the images are digitized, stored, read out alternately at a rate of about ten per second and displayed to produce an image which is perceived by an observer as having depth.

14 Claims, 1 Drawing Sheet

THREE-DIMENSIONAL DISPLAY METHODS AND APPARATUS

SPECIFICATION

This invention relates to methods and apparatus for generating and displaying three-dimensional images of a subject, and more particularly to new and improved methods and apparatus of this character in which the images are derived from a single camera system.

BACKGROUND OF THE INVENTION

Three-dimensional imaging systems have been proposed heretofore that are capable of producing images having enhanced depth although viewed directly without the use of special glasses or monitors. U.S. Pat. No. 4,429,328, for example, discloses a system in which images of a subject as viewed alternately by multiple cameras first from one point of origin and then, time displaced, from another point of origin at a rate within a range of 4 to 30 times per second develop a three-dimensional illusion when displayed on a viewing surface.

U.S. Pat. No. 4,528,587 discloses a similar system in which a plurality of video cameras oriented to view a subject from several points of origin are coupled to a display device for alternately supplying thereto first and second composite picture frames including first and second fields corresponding, respectively, to the outputs of the two cameras. The output may be mixed with either the output of the first or second camera to generate an image having a substantial and continuously present component of the images produced thereby to reduce undesirable motion in the generated picture.

It is an object of the invention to provide a new and improved method and apparatus of the above general character for three-dimensional imaging which utilizes only a single camera for viewing the object which is to be imaged.

Another object of the invention is to provide a new and improved method and apparatus of the above character which is capable of generating high quality three-dimensional images in near real-time.

SUMMARY OF THE INVENTION

These and other objects of the invention are attained by viewing an object to be scanned with an imaging device that is moved in constant relation to the object and at constant velocity to provide a sequence of stereoscopically related images of the object as viewed from different perspective. Pairs of stereoscopically related images of the sequence are carefully registered and presented alternately at a rate in the range of 4 to 30 times per second for viewing by the eye of an observer. The resulting image is perceived as having depth and is achieved without the use of special glasses or other viewing aids.

In one embodiment, the single source imaging device may be a motion picture camera disposed on a moving platform such as an aircraft flying at constant altitude and velocity, for example, and arranged to generate a motion picture record of the subject matter viewed by the camera. According to the invention, stereoscopically related images on the record generated by the camera are selected, registered and presented alternately to the eye of an observer at a rate within the range of four to thirty times per second, preferably about ten per second, to produce a resulting image that is perceived as having depth.

Alternatively, stereoscopically related image frames recorded by the airborne camera may be selected and recorded in an alternating sequence to produce a new film record which, when projected, presents the stereoscopically related images alternately to the eye of an observer so that the resultant image is perceived as three-dimensional, although viewed without the use of special glasses or other aids.

A video camera may be used instead of a motion picture camera as the single image source. In such case, the stream of stereoscopically related electronic images generated by the video camera are preferably digitized and stored, meas being provided to read out sequential sets of stored images alternately at the proper rate to produce a video image that can be perceived as three-dimensional. Desirably, means is provided for controlling the separation between the sets of stored images to be read out to enable adjustment of the perceived depth in the resultant image veiwed by an observer.

The invention may be better understood from the following detailed description, taken in conjunction with the accompanying drawings, in which.

DETAILED DESCRIPTION

Figure 1:
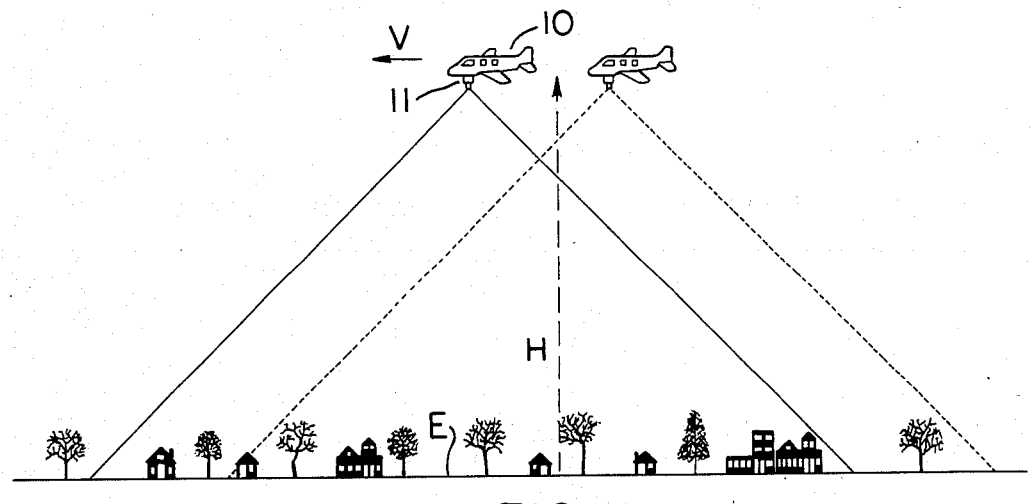
FIG. 1 illustrates schematically an aircraft-mounted camera for recording a stream of stereoscopically related images according to the invention.

By way of illustration, the invention will be described first as applied to aircraft reconnaisance. Referring first to FIG. 1, an aircraft 10 is shown flying at a constant altitude H and velocity V above a portion of the earth's surface E. Fixedly mounted on the aircraft 10 is a conventional motion picture camera 11 aimed either straight down or at an oblique forward or rearward angle so as to view the earth's surface E. The camera 11 is so disposed that the apparent motion of the ground viewed from the aircraft 10 is recorded on successive frames of film in the camera as a motion from top to bottom. It will be understood that the images recorded in successive frames are time displaced and correspond to views of the subject scanned as seen from distance displaced viewing locations. If one frame from a film record so made is compared with another nearby frame, it is seen that there is considerable overlap in the two images, and when the two frames are viewed stereoscopically, a three-dimensional image results.

If the images recorded on two such nearby but sufficiently spaced apart frames are accurately registered and are presented alternately at a rate of, say, approximately ten times per second for viewing by an observer, in the manner disclosed in the aforementioned patents, the resulting image is perceived as having depth. This perception of depth is achieved without the use of special glasses or other viewing aids.

It is possible, according to the invention, to reorder the individual frames recorded on a film taken with the airborne camera 10 and to utilize them to produce a new film record that is perceived as three-dimensional when projected. To this end, two identical timed work prints 12 and 13 (FIG. 2) are made from the original negative obtained with the airborne camera 10. The two work prints are placed in an optical printer (not shown) and aligned for AB printing with corresponding images in the two prints offset from each other by a sufficient number of frames so that the resulting print contains images that evolve in time with alternating viewpoints that differ in vertical parallax, in the manner described in the aforementioned prior patents.

In earlier work in three-dimensional imaging with the alternating frame method, good results have been obtained with a nominal parallax angle (i.e., the angle between the apparent lines of sight for the respective frames to the subject being scanned) of about 1°. At a speed of, say, 120 mph and an altitude of 1100 feet for the aircraft 10, a point on the ground directly below the aircraft appears to move through an angle of 9° in one second. Thus, an apparent motion of 1° takes place in only 1/9 second. At a camera speed of 24 frames per second, three frames correspond to $\frac{1}{8}$ second and, therefore, to a parallax angle of about 1.1°. Because the heights of objects on the ground are small as compared to the altitude of the aircraft, larger parallax angles than this are desirable in order to increase the apparent depth in the final image. Thus, parallax angles in the range from 1.9° to 3.4°, corresponding to frame separations in the range from five to nine frames, are preferred.

Figure 2:
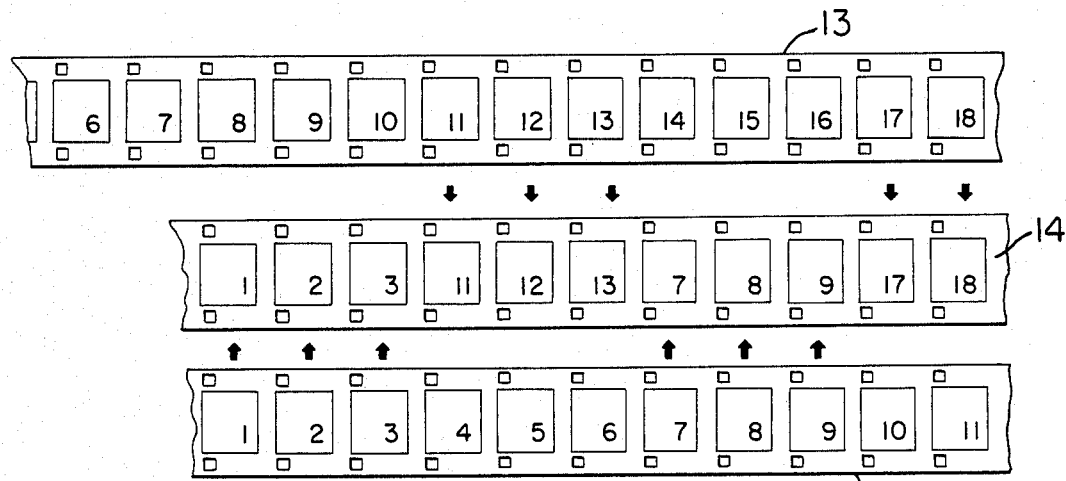
FIG. 2 illustrates one way of making a three-dimension film from a film record made by the camera shown in FIG. 1.

In the preparation of the AB print 14 made from the work prints 12 and 13, the print 13 was advanced by seven frames and frame eight was carefully aligned with frame 1 of print 12 so that the central portions of the two frames were in exact registration. In the optical printing, the unmatched parts of the image at the top and bottom of the frame were removed, resulting in the elimination of about 15% of the image. A timed AB print 14 was then generated from the two work prints by alternately printing three frames from print 12, then three frames from print 13, in the sequence 1,2,3,11, 12, 13, 7, 8, 9, 17, 18, 19, etc., as shown in FIG. 2. It will be seen that the resulting print 14 contains images that evolve in time with alternating viewpoints that differ in vertical parallax in the manner described in the prior patents mentioned above, so that, when projected, the film is perceived as three-dimensional.

Figure 3:
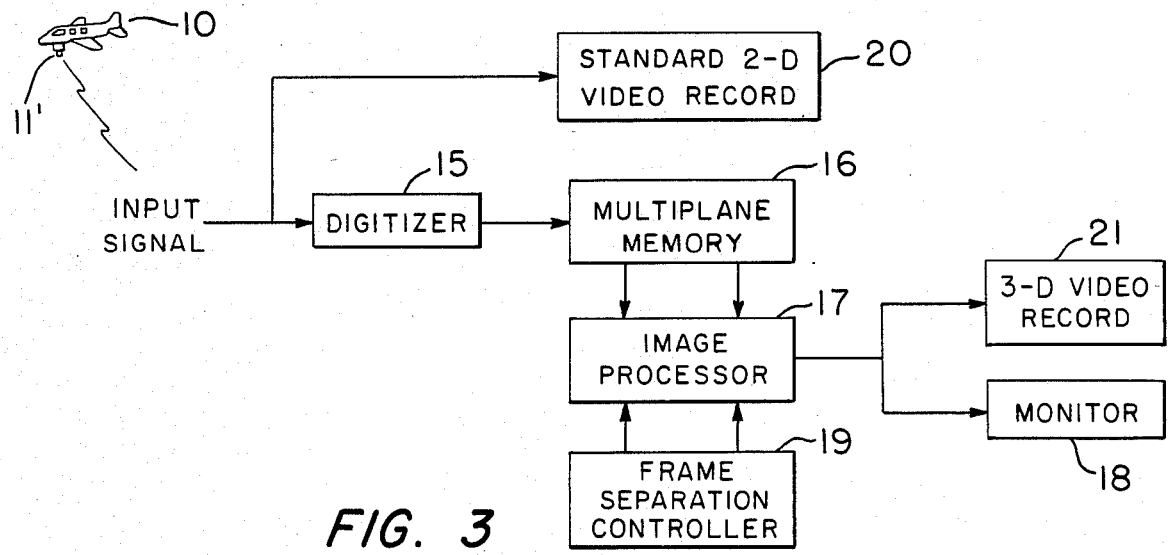
FIG. 3 is a schematic diagram of a typical three-dimensional imaging system using a single video camera as an image source according to the invention.

It is possible, according to the invention, to generate three-dimensional images in near real-time by mounting an electronic video camera 11' on the aircraft 10 to produce a temporal stream of images for processing on board the aircraft or for telemetering to a command base station for processing. As shown in FIG. 3, the signals from the video camera 11' are fed to a conventional digitizer 15 and the digitized individual frames are stored sequentially in a conventional multiplane memory 16, successive update frames being stored sequentially in a wraparound fashion. Images suitably displaced in time to produce a perception of depth are read out of the memory 16 alternately at a rate of about ten times per second by an image processor 17 and supplied to a dynamic display device such as a cathode ray tube monitor 18. A controller 19 allows a viewer to control the offset between corresponding sequential images by adjusting the frame separation to meet the needs of the observational task at hand. The two-dimensional signal received from the aircraft 10 and the three-dimensional signal from the processor 17 may be recorded by conventional video recorders 20 and 21.

As previously stated, the delay necessary to produce the three-dimensional signal is a function of the altitude, aircraft speed and parallax angle required to generate the desired depth magnitude. Nominally, the delay shoud be no more than about three or four seconds, although with extremely high altitudes and/or slowly moving platforms specific values may need to be calculated.

Standard image processing techniques can be used to stretch and adjust the image for angular distortions. Also, artifical intelligence techniques could be employed to track the alignment of the time shifted images to insure proper registration and thereby eliminate all distorting motions from the three-dimensional image.

The invention thus enables three-dimensional images to be generated effectively from a single source mounted on a moving platform without the use of special glasses or other viewing aids. By employing a video camera and video processing, high quality three-dimensional images may be generated in near real-time. The resulting stereoscopic signals can be recorded, edited and played back on standard video equipment. Also, because only a single source is used, there are no problems with matching colors or luminance and no light loss to beam splitters or other special optical systems. Moreover, normal two-dimensional images can be recorded simultaneously with the three-dimensional images without interfering with the three-dimensional processing.

The invention is not limited to motion picture or television cameras but has broad application to computer-generated images as well. Moreover, the camera used for generating the sequence of original images need not be limited to visible light but can be sensitive to visible, infrared, ultraviolet, or any other radiation.

While the invention has been illustrated herein as applied to aerial reconnaissance, it will be understood that other applications such as satellite observation or in under-water environments, for example, are possible. The several embodiments described above are intended to be merely illustrative, and modifications in form and detail are possible within the scope of the invention as defined in the following claims.

We claim:

1. A method for producing a three-dimensional illusion of a subject comprising the steps of:
   generating at a predetermined frame rate a single sequence of images of said subject as viewed by a camera carried by a moving vehicle spaced from said subject as said vehicle is moved at constant velocity and constant spacing with respect to said subject, and
   presenting for viewing on a viewing surface alternately at a rate in the range of about four to thirty per second selected successive sets of images in said sequence that have a frame separation therebetween depending on the velocity and spacing of said camera with respect to said subject so as to differ in parallax in the direction of movement of said vehicle by an amount sufficient to create a resultant image which as viewed by an observer is perceived as having depth.

2. A method as defined in claim 1, wherein said selected successive sets of images in said sequence are retrievably recorded sequentially and retrieved and presented alternately to view at a rate in the range from about four to about thirty per second.

3. A method as defined in claim 2, wherein said sequence of images of said subject is generated in the form of a film record in a motion picture camera mounted on a platform on said vehicle moving at a constant velocity and spacing with respect to the subject to be imaged, wherein said retrievably recorded selected successive sets of images are obtained by making two identical work prints from said film record, aligning said work prints with corresponding images offset from each other by a sufficient number of frames that when printed onto a third print and the third print projected on a viewing surface the resulting images differ in parallax in the direction of movement of said camera by said sufficient amount, and printing the thus aligned work prints onto a third print, and wherein said third print is displayed by projection on a viewing surface.

4. A method as defined in claim 1, wherein said sequence of images of said subject is generated by a video camera, the images in said sequence are digitized and stored in memory, and selected successive sets of stored images that differ in parallax in the direction of motion of said vehicle by an amount sufficient that when said selected successive sets of images are presented alternately at a rate in the range from about four to thirty per second they create a resultant image which as viewed by an observer is perceived as having depth are read out of storage and presented on a screen for viewing alternately at a rate in the range from about four to about thirty per second, whereby the resulting image as viewed by an observer is perceived as having depth.

5. Apparatus for producing a three-dimensional illusion of a subject comprising, in combination:

electronic imaging means mounted on a vehicle for generating a sequence of electric signals representing a sequence of images of said subject as viewed by said imaging means from a location spaced from said subject as said vehicle is moved at constant velocity and constant spacing with respect to said subject, means for digitizing said electric signals, means for storing said digitized electric signals, means for selecting for readout from said storing means selected successive sets of spaced apart images in said stored sequence that differ in parallax in the direction of movement of said vehicle by an amount sufficient that when presented for viewing alternately at a rate of about ten per second they create a resultant image which as viewed by an observer is perceived as having depth, and means for displaying said selected sets of images alternately at a rate of about ten per second, whereby the resulting image displayed as viewed by an observer is perceived as having depth.

6. Apparatus as defined in claim 5, wherein said electronic imaging means comprises a video camera mounted on a platform mounted on a vehicle moving at constant velocity and spacing with respect to said subject, and wherein said apparatus further comprises means for controlling the amount of separation between the images selected for display.

7. Apparatus as defined in claim 6, wherein said apparatus further comprises means for recording the successive sets of images selected for readout from said storing means by said selecting means.

8. Apparatus for producing in near real-time a three-dimensional illusion of a subject comprising, in combination:

electronic imaging means supported on a platform carried by an airborne vehicle for generating at a predetermined frame rate a sequence of electric signals representing a sequence of images of said subject as viewed by said imaging means from a location spaced above said subject as said vehicle is moved at constant velocity and constant spacing with respect to said subject;

means for digitizing said electric image-representing signals;

means for storing said digitized image-representing means for selecting for readout from said storing means electric signals representing sets of images having a frame separation so as to differ in parallax in the direction of movement of said vehicle by an angle in the range from 1.9 degrees to 3.4 degrees such that when images represented by said selected sets of electric signals are presented on a viewing surface alternately at a rate of about ten per second a resultant image is created which as viewed by an observer is perceived as having depth;

means for presenting for viewing on a viewing surface alternatively at a rate of about ten per second images represented by said selected sets of electric signals, and means for controlling the frame separation of images for readout from said storing means for optimizing the perception of depth in the displayed image.

9. Apparatus as defined in claim 8, wherein said apparatus further comprises means for recording for later display said sets of electric signals selected by said selecting means for readout from said storing means.

10. Apparatus as defined in claim 8, wherein said means for alternately presenting the images for viewing is a television monitor.

11. A method for producing a three-dimensional illusion of a subject comprising the steps of:

recording at a predetermined frame rate a single sequence of images of said subject as viewed from an airborne vehicle moving at constant velocity and with constant spacing with respect to said subject, and sequentially displaying on a viewing surface at a rate in the range of about four to thirty per second sets of images of the subject selected from said single sequence that in each set are separated by a sufficient number of frames as to differ in parallax in the direction of movement of said vehicle by an amount sufficient to create on said viewing surface a resultant image which as viewed without the aid of stereoscopic viewing devices is perceived as having depth.

12. The method of claim 11, wherein said single sequence of images is recorded on a single photographic film at a rate of twenty-four images per second, and wherein the images in each selected set have a frame separation in the range from five to nine frames depending on the velocity and spacing of said vehicle with respect to said subject.

13. The method of claim 11, wherein said single sequence of images is recorded in signal storing means at a rate of thirty images per second as a sequency of image-representing electrical signals, and wherein electrical signals representing said sets of images selected from said single sequence are displayed for viewing on the screen of a television monitor.

14. The method of claim 13, wherein the images in each selected set have a frame separation in the range from five to nine frames depending on the velocity and spacing of said vehicle with respect to said subject.

* * * * *

UNITED STATES PATENT AND TRADEMARK OFFICE
CERTIFICATE OF CORRECTION

PATENT NO. : 4,807,024

DATED : February 21, 1989

INVENTOR(S) : McLaurin et al.

It is certified that error appears in the above-identified patent and that said Letters Patent is hereby corrected as shown below:

<u>First page, 3rd line of Item 56</u>, "Gorden" should read --Gordon--;

<u>Col. 1, line 52</u>, "perspective" should be --perspectives--;

<u>Col. 2, line 15</u>, "meas" should read --means--;

<u>Col. 2, line 21</u>, "veiwed" should read --viewed--;

<u>Col. 4, line 8</u>, "artifical" should read --artificial--;

<u>Col. 6, line 8</u>, "image-representing" should read --image-representing signals;--;

<u>Col. 6, line 9</u>, "means ..." should begin at the lefhand margin;

<u>Col. 6, line 20</u>, "alternatively" should be --alternately--.

Signed and Sealed this

Twenty-fourth Day of October, 1989

Attest:

DONALD J. QUIGG

*Attesting Officer*      *Commissioner of Patents and Trademarks*